United States Patent
Park et al.

(10) Patent No.: US 7,269,923 B2
(45) Date of Patent: Sep. 18, 2007

(54) METHOD OF PREPARING TRICHOLOMA MATSUTAKE-INFECTED YOUNG PINE BY COCULTURING ASEPTIC PINE SEEDLINGS AND T. MATSUTAKE

(75) Inventors: Moo-Chang Park, Daegu-si (KR); Sang-Gab Sim, Gyeongju-si (KR); Woo-Jae Cheon, Pohang-si (KR)

(73) Assignee: Govenor of Gyeongsangbukdo, Daegu-si (KR)

( * ) Notice: Subject to any disclaimer, the term of this patent is extended or adjusted under 35 U.S.C. 154(b) by 727 days.

(21) Appl. No.: 10/656,496

(22) Filed: Sep. 5, 2003

(65) Prior Publication Data

US 2006/0086044 A1  Apr. 27, 2006

(30) Foreign Application Priority Data

Sep. 6, 2002 (KR) .................... 10-2002-0053759

(51) Int. Cl.
*A01C 1/08* (2006.01)
(52) U.S. Cl. ................................. 47/58.1 SE
(58) Field of Classification Search ............ 47/1.1, 47/58.1 SE, 58.1 R
See application file for complete search history.

(56) References Cited

U.S. PATENT DOCUMENTS

| | | | | |
|---|---|---|---|---|
| 4,345,403 A | * | 8/1982 | Giovannetti | 47/1.1 |
| 5,178,642 A | * | 1/1993 | Janerette | 47/58.1 R |
| 6,907,691 B2 | * | 6/2005 | Miller | 47/1.1 |
| 6,951,074 B2 | * | 10/2005 | Miller | 47/1.1 |
| 2006/0048444 A1 | * | 3/2006 | Kitagou et al. | 47/1.1 |

FOREIGN PATENT DOCUMENTS

| | | | |
|---|---|---|---|
| JP | 05211819 A | * | 8/1993 |
| JP | 07147841 A | * | 6/1995 |
| JP | 2626778 | | 4/1997 |
| JP | 09201129 A | * | 8/1997 |
| JP | 2001078566 A | * | 3/2001 |
| JP | 2001169661 A | * | 6/2001 |

OTHER PUBLICATIONS

Yamada, A et al., " Ectomycorrhiza formation of Tricholoma matsutake isolates on seedlings of Punus densiflora in vitro", Mycoscience 40: pp. 455-463, 1999.

* cited by examiner

*Primary Examiner*—Francis T. Palo
(74) *Attorney, Agent, or Firm*—Mathews, Shepherd, McKay & Bruneau, P.A.

(57) ABSTRACT

Disclosed is a method of preparing *Tricholoma matsutake*-infected young pine trees by coculturing aseptic seedlings of a pine tree with a *T. matsutake* isolate, comprising the steps of liquid-culturing fruit bodies of naturally occurring *matsutake* mushrooms in PDB (Potato Dextrose Broth, Difco) and inoculating *T. matsutake* KBFERI 20T05 isolated from the cultured fruit bodies; placing mixed soil of perlite and *sphagnum* peatmoss and K-liquid medium onto the inoculated fungus; and planting aseptic seedlings obtained by aseptically germinating pine seeds into the mixed soil, and then culturing the pine seedlings with the *T. matsutake* isolate to allow ectomycorrhiza formation on the fine roots of the pine seedlings. The method of the present invention is advantageous in terms of giving objectivity for the fungal inoculum by employing as an inoculum a fungus having DNA homology with the conventionally known *T. matsutake*, and of making it possible to mass produce *T. matsutake*-infected pine trees throughout the Year.

5 Claims, 5 Drawing Sheets
(5 of 5 Drawing Sheet(s) Filed in Color)

METHOD OF PREPARING TRICHOLOMA MATSUTAKE-INFECTED YOUNG PINE BY COCULTURING ASEPTIC PINE SEEDLINGS AND T. MATSUTAKE

BACKGROUND OF THE INVENTION

1. Field of the Invention

The present invention relates to a method of preparing a *Tricholoma matsutake*-infected young pine tree by coculturing aseptic seedlings of pine and *Tricholoma matsutake*. More particularly, the present invention relates to a method of selectively infecting the roots of pine seedlings only with *T. matsutake* through culturing aseptic seedlings of a pine tree with mycelia of a *T. matsutake* isolate.

2. Description of the Prior Art

*Tricholoma matsutake* is a fungus belonging to *Basidiomycotina Agaricales Tricholomataceae*, and naturally occurs in needle-leaf forests including *Pinus densiflora, Pinus pumila, Picea abies* and *Picea jezoensis*. Especially, in Korea, the fungus is known to inhabit only pine forests. The fungus *T. matsutake* is one of the most-preferred edible mushrooms in Korea and Japan, and is a major source of income especially in the Korean East coast region. The fungus emits a unique fragrance, and aromatic components responsible for such fragrance include 1-octen-3-ol, 2-octanol, 1-octene and 4-methyl cinnamate. The edible fungus *T. matsutake*, exsisting as a parasite on the roots of live trees, mainly on the fine roots of pine trees (for example, *Pinus densiflora*), lives symbiotically with the trees while forming ectomycorrhizas. However, there have been no reports of in vitro fruit body formation of the ectomycorrhizal fungus. A Korean research group tried to produce pine trees infected with the fungus *T. matsutake* in vitro by the conventional method of transplanting pine seedlings into the soil around the fairy rings of the fungus, but the results were not satisfactory (T S Kim, G H Ga, H Park, Y C Park, G H Yoon and G Y Lee. 1999, In vitro cultivation of *T. matsutake* and increase of its production yield, Publications published by the Korean Forest Research Institute Vol. 153:13-16). The Ibaraki Prefectural Forestry Center reported successful ectomycorrhizal formation of the *T. matsutake* fungus on seedlings of *Pinus densiflora* (Akiyoshi Yamada, Ken Maeda and Masatake Ohmasa. 1999. Ectomycorrhizal formation of *Tricholoma matsutake* isolates on seedling of *Pinus densiflora* in vitro, Mycoscience 40:455-463).

Because the fungus is a root parasite of live trees, it is difficult to form fruit bodies (mushrooms) of *T. matsutake* fungus in vitro. For this reason, *matsutake* mushrooms have been conventionally cultivated simply by controlling environmental factors affecting *matsutake* mushroom development, such as humidity, light intensity, temperature and the like. That is, favorable environments for *matsutake* mushroom development were achieved by a series of field work including irrigation, removal of fallen leaves and covering mushrooms with a cup. This cultivation method could significantly increase mushroom yield, but its application was limited to areas where the *matsutake* mushroom naturally occurs. In more detail, examples of such a mushroom cultivation method include as follows: first, cultured *T. matsutake* mycelia are spread on the field in which *matsutake* mushrooms occur, and then newly formed mycelia are transplanted into the soil; second, spores are collected from fruit bodies of *T. matsutake* and spread on the field in which *matsutake* mushrooms occur; and third, the live *T. matsutake* mycelia-containing soil is spread on the field in areas where *matsutake* mushrooms have not developed. The *T. matsutake* fungus transplanted by the aforementioned methods failed to grow into fungal colonies owing to its property of having a lower mycelia growth rate than bacteria and other filamentous fungi, resulting in loss of the *T. matsutake* fungus due to rain or according to soil states while the roots of pine trees are not infected with the fungus.

In addition, *matsutake* mushrooms can be cultivated by planting seedlings of pine trees into the soil around the fairy rings of *T. matsutake*, which are naturally formed around pine trees, allowing the seedlings to grow for several years, and then transplanting the resulting pine trees into the *matsutake* non-mushroom-producing field. However, this method causes the planted pine seedlings to be infected and rooted with a number of other similar fungi that naturally occur in the field, before infection with *T. matsutake*. Moreover, identification of rooted fungi requires complex experimental techniques. Therefore, pine trees infected with *T. matsutake* are not obtained in high yield.

SUMMARY OF THE INVENTION

Based on the fact that mycelia of *T. matsutake* penetrate into the pine roots and the fungus lives symbiotically with the pine trees, the present inventors selectively infected the roots of pine trees by in vitro coculturing aseptic seedlings of the pine trees of a *T. matsutake* isolate.

It is therefore an object of the present invention to provide a method of preparing a *T. matsutake*-infected young pine tree.

The above object was achieved by inoculating, into a sterilized culture container, *T. matsutake* KBFERI 20T05 isolated from fruit bodies of naturally occurring *matsutake* mushroom liquid-cultivated in PDB medium (Potato Dextrose Broth, Difco), placing a soil mixture of perlite and *sphagnum* peatmoss and K-liquid medium onto the inoculated fungus, planting aseptic seedlings obtained by aseptically germinating pine seeds into the mixed soil, and then culturing the pine seedlings with *T. matsutake* to allow ectomycorrhiza formation on the fine roots of the pine seedlings.

BRIEF DESCRIPTION OF THE DRAWINGS

The patent or application file contains at least one drawing executed in color. Copies of this patent or patent application publication with color drawings will be provided by the Office upon request and payment of the necessary fees.

The above and other objects, features and other advantages of the present invention will be more clearly understood from the following detailed description taken in conjunction with the accompanying drawings, in which.

DETAILED DESCRIPTION OF THE INVENTION

The present invention is directed to a method of preparing a *T. matsutake*-infected young pine tree by coculturing pine seedlings and fruit bodies of *T. matsutake*, comprising the steps of preparing a culture container capable of containing infection medium, inoculating fruit bodies of *T. matsutake* KBFERI 20T05 into the culture container, preparing mixed soil and K-liquid medium for growth of pine seedlings to give an infection medium, and planting the pine seedlings into the infection medium.

In detail, the present invention provides a method of preparing a *T. matsutake*-infected young pine tree by coculturing aseptic pine seedlings and *T. matsutake*, comprising the steps of inoculating fungal mycelia obtained by pulverizing *T. matsutake* fruit bodies liquid-cultured in PDB medium into the bottom of a sterilized culture container at an amount of 0.01-0.02 mg dry weight/mL sterile water; mixing perlite and *sphagnum* peatmoss at a ratio of 80:1-2, and placing the resulting mixed soil onto the inoculated fungal mycelia; preparing K-liquid medium containing 1.65 g of $NH_4NO_3$, 0.2 g of $KNO_3$, 0.002 g of $CaCl_2.2H_2O$, 0.02 g of KCl, 0.2 g of $KH_2PO_4$, 0.9 g of $MgSO_4.7H_2O$, 0.2 g of $(NH_4)_2HPO_4$, 0.5 g of $NH_4$-Tar, 0.5 ml of Fe-Cit, 0.031 g of $H_3BO_3$, 0.01516 g of $MnSO_3.4H_2O$, 0.0086 g of $ZnSO_4.7H_2O$, 0.00083 g of KI, 0.00025 g of $Na_2MoO_4.2H_2O$, 100 μg of Thiamine HCl, 1.0 g of malt extract, 0.5 g of yeast extract, 0.3 g of casein and 3.0 g of glucose per 1 L in water, adjusting pH of the medium to pH 5.5-5.6, and aliquotting the K-liquid medium onto the mixed soil; aseptically germinating pine seeds up to 3 cm in length, planting the resulting aseptic seedlings into infection medium containing the mixed soil and the K-liquid medium, and covering the culture container with a lid; and coculturing the pine seedling and the *T. matsutake* mycelia at 15-25° C. for 24 hrs under 10-40,000 lux light intensity.

The method of the present invention will be described in more detail as follows.

Step 1: Preparation and Sterilization of a Culture Container Capable of Containing Infection Medium First, a culture container containing infection medium for coculturing of pine seedlings and *T. matsutake* is prepared, and autoclaved at 121° C. for 20 min under a pressure of 1.2 atmospheres. The culture container should be made of a material which will not be modified or melted during sterilization, and be safe from infection with microorganisms during coculturing.

On the other hand, the culture container may be preferably prepared of a biodegradable material. However, when planting pine trees infected with the *T. matsutake* fungus into the field in a state of being placed in a biodegradable culture container, it takes a long time for the material to be biodegraded. Therefore, it is preferable to prepare the culture container taking into consideration both coculturing and transplanting into the field. In this regard, in the present invention, the culture container is used in a state of having a paper cup inside when carrying out coculturing, and the paper cup is discarded when pine seedlings infected with the fungal mycelia are transplanted into the field. Preferably, with reference to FIG. 3, a commercially available paper cup (relatively small sized cup) is tightly inserted into the inside of the culture container while not being exposed to the upper portion of the culture container, and the culture container is then covered with a transparent lid. Although its appearance is changeable for sterilization and culturing, the paper cup is very useful since the paper cup maintains its contents without modification during the period ranging from coculturing to transplanting into the field and rarely affects growth of pine seedlings and *T. matsutake* mycelia. The culture container may be preferably further sterilized by exposure to ultra violet light on a clean bench immediately after autoclaving.

Step 2: Inoculation of Liquid-Cultured *T. matsutake* KBFERI 20T05 into Infection Medium

*T. matsutake* KBFERI 20T05 derived from naturally occurring *matsutake* mushroom is inoculated with uniform distribution into the bottom of the sterilized culture container prepared in Step 1.

Rather than *T. matsutake* conventionally known or determined by its appearance or sensory evaluation, it is preferable to use as an inoculum a *T. matsutake* isolate from fruit bodies of a *matsutake* mushroom, which has been identified to have DNA sequence homology with the conventionally known *T. matsutake*. Therefore, the present invention employs *T. matsutake* KBFERI 20T05 having over 99% homology with the Gene Bank-registered DNA sequences of the ITS region, the whole region of 5.8S and a portion of 18S of the conventionally known *T. matsutake*. DNA sequences of the fungus KBFERI 20T05 have been registered in the Gene Bank. The *T. matsutake* isolate KBFERI 20T05 is cultured in PDB medium (Difco). The resulting mycelial masses are washed with K-liquid medium (pH 5.6) prepared according to the composition listed in Table 1, below, and filtered with a sterilized mesh, and pulverized into fine particles in K-liquid medium using a Waring's autoclavable blender 31L91. Then, the pulverized mycelia are transferred to a clean bench, and, after opening the culture container, uniformly inoculated onto the bottom of the sterilized culture container using a 10 ml glass pipette. The inoculated mycelia grow forming multi-layered colonies, and this type of growth pattern increases contact of the fine roots of the pine seedlings with the fungus *T. matsutake*. Herein, the mycelial masses are preferably very finely pulverized with the blender. In addition, since heat generated during the pulverization process negatively affects growth of the *T. matsutake* mycelia, pulverization is preferably carried out using precooled K-liquid medium at a temperature below 5° C., generated, for example, by placing in the refrigerator. The fungal mycelia are inoculated at an amount of 0.05-0.10 mg dry weight with 5 ml of K-liquid medium. Dry weight of the inoculum is calculated by performing a procedure of placing 5 ml of K-liquid medium containing the pulverized fungal mycelia into a small container, drying it, and weighing the resultant excluding the weight of the filter paper, and then repeating the above procedure 20 times and averaging the resulting weight values. The inoculation amount greatly affects contact between the fine roots of the pine seedlings and the *T. matsutake* mycelia. Increasing inoculation amounts of the fungal mycelia enhances their contact with the roots of the pine seedlings. However, since the fungus *T. matsutake* has a lower mycelial growth rate when being inoculated at a higher concentration, the aforementioned inoculation amount is thought to be proper.

On the other hand, in order to enhance contact of the *T. matsutake* mycelia with the fine roots of the pine seedlings, K-solid medium of pH 5.5-5.6 may be added into the bottom of the culture container.

The composition of K-solid medium is listed in Table 1, below. Typically, an optimal pH value for in vitro cultivation of plants ranges from about 5.7 to 5.8, and optimal pH of the fungus *T. matsutake* is about 5.4. To provide a proper environment for growth of the two cocultured organisms, K-solid medium is adjusted to pH 5.5-5.6. In addition, the fungus *T. matsutake* typically shows low proliferation in liquid culture. Therefore, in order to enhance the growth rate of the fungus *T. matsutake*, K-solid medium placed in the bottom of the culture container contains high carbon sources. In order to increase the biomass of *T. matsutake* in a short period time and completely consume the high carbon source in K-solid medium, a minimal amount of K-solid medium is aliquotted into the bottom of the culture container, preferably, at a thickness below 2 cm, and more preferably, 0.5 mm. When K-solid medium is used in high concentration, *T. matsutake* simply continues to grow using carbon sources present in high amount concentration without penetration into the fine roots of the pine seedlings, resulting in no formation of ectomycorrhiza on the pine roots.

TABLE 1

| Nutrients | Content (g/L) |
| --- | --- |
| $NH_4NO_3$ | 1.65 |
| $KNO_3$ | 0.2 |
| $CaCl_2 \cdot 2H_2O$ | 0.002 |
| KCl | 0.02 |
| $KH_2PO_4$ | 0.2 |
| $MgSO_4 \cdot 7H_2O$ | 0.9 |
| $(NH_4)_2HPO_4$ | 0.2 |
| $NH_4$-Tar | 0.5 |
| Fe-Cit | 0.5 ml (1%) |
| $H_3BO_3$ | 0.031 |
| $MnSO_3 \cdot 4H_2O$ | 0.01516 |
| $ZnSO_4 \cdot 7H_2O$ | 0.0086 |
| KI | 0.00083 |
| $Na_2MoO_4 \cdot 2H_2O$ | 0.00025 |
| Thiamine HCl | 100 µg |
| Malt extract | 1.0 |
| Yeast extract | 0.5 |
| Casein | 0.3 |
| Glucose | 3.0 |
| Phytagel | 2.0 for solid medium |

Step 3: Preparation of Infection Medium Using Mixed Soil and K-Liquid Medium

In order to cultivate the pine seedlings, a mixture of perlite and *sphagnum* peatmoss is poured onto the inoculated *T. matsutake* mycelia in Step 2 with K-liquid medium, wherein the K-liquid medium is used to prevent the pine seedlings from withering due to dryness.

Bed soil used in the infection medium is a mixture of perlite and *sphagnum* peatmoss at a ratio of 80:1-2. Perlite is widely used as a bed soil. Also, because it rarely contains other organic and inorganic compounds, perlite is suitable for addition of K-solid medium or K-liquid medium. *Sphagnum peatmoss* is used for moisture control. The use of *shagnum peatmoss* in very low concentrations is due to its strong acidity. In case of using a culture container containing a paper cup, after being sterilized in a state of being placed in a container, the mixed soil is poured into the *T. matsutake* mycelia-inoculated culture container prepared in the above steps up to the same height of the paper cup in order to prevent K-liquid medium to be poured onto the mixed soil from going into the space between the culture container and the paper cup, wherein addition of the soil is carried out on a clean bench.

On the other hand, K-liquid medium having the composition shown in Table 1, above, is autoclaved at 121° C. for 20 min under a pressure of 1.2 atmospheres and cooled. Then, 100 ml of K-liquid medium is poured onto the mixed soil on a clean bench. The small amount of K-liquid medium added can prevent dryness during culturing, thus preventing the pine seedlings from withering.

Step 4: Preparation of Aseptic Seedlings of Pine and Their Planting into Infection Medium Pine seeds are aseptically germinated, and the resulting pine seedlings are planted into the infection medium containing the mixed soil and K-liquid medium prepared in Step 3 while the roots face downward and the seed leaves face upward. After that, the culture container is covered with a lid.

On the other hand, in order to obtain pine seedlings, pine seeds are sterilized by being immersed in 70% ethanol for 10-60 sec and being treated with 0.5-3% (optimal 2%) sodium hypochlorite for 1-7 min, and then washed with sterile water 3-4 times. When being treated with sodium hypochlorite for a longer time, the pine seeds have low germination rates. Therefore, it is suitable for the seedlings to be treated with sodium hypoclorite for about 5 min. After peeling the testa under aseptic conditions, the sterilized seeds are planted onto solid medium prepared using Nutrient Broth (Scharlau) and agar (8 g/L) and hardened in sterilized disposable petri dishes, and incubated at 15-28° C. (optimal: 23-26° C., typical temperature for seed germination: 24° C.). The germinated seeds both not contaminated with microorganisms and being 3 cm in length are selected. Seedlings over 3 cm in length easily fall down or wither. The selected pine seedlings are planted into the culture container prepared in Step 3, which contains the infection medium into which *T. matsutake* mycelia have been inoculated. Herein, the seedlings are planted into the mixed soil about 2 cm deep and less than 1 cm high while the roots face downward and the seed leaves face upward.

Step 5: Culturing Step for Production of *T. matsutake*-infected Young Pine Trees In order to produce young pine trees having fine roots infected with *T. matsutake*, the pine seedlings planted into the culture container, which are prepared in Step 4, are incubated at 15-25° C. for 24 hrs under 10-40,000 lux light intensity.

Typically, infection of *T. matsutake* into the fine roots of the pine seedlings is carried out at 15-25° C. *Agrobacterium tumefacience*, used as a vector for integration of foreign genes into plant chromosomes, is known to infect plants at an optimal temperature of 20° C. In this regard, the infection process of *T. matsutake* in the present invention is carried out at 20° C. The most important factor, light intensity, is in a range of 10-40,000 lux. Natural light is about 20,000 lux, but to artificially maintain such a natural light intensity is problematic owing to significant problems including lowered transmittance of culture containers and overheating of illuminators. Therefore, the present invention employs three-wavelength fluorescent lamps. The infection process is carried out in an incubator equipped with 4 or more fluorescent lamps while maintaining the culture container under a light intensity of over 8,000 lux in order to last supply of carbon sources essential for plant growth. These culture conditions spontaneously induce the infection mechanism of the fungus *T. matsutake* as it attempts to obtain carbon sources.

Step 6: Evaluation of Mycorrhiza Formation on the Fine Roots of Pine Seedlings

After coculturing the pine seedlings and the *T. matsutake* mycelia, mycorrhizas formed on the fine roots of the pine seedlings are evaluated for fragrance, and states of the fungal mycelia penetrated into the fine roots of pine seedlings are observed under a stereoscopic microscope, a fluorescent microscope and an electron microscope.

The *T. matsutake* mycelia were found to infect the pine seedlings within 70 days after culturing. Mycorrhizas formed on the fine roots of the pine seedlings were found to give out the same fragrance as *matsutake* mushrooms. Also, under a light microscope, a fluorescent microscope and an electron microscope, the mycelia were found to penetrate into the fine roots. A portion of the formed mycorrhizas was aseptically excised, and planted onto MMN (Modified Melin-Norkron) medium, followed by incubation. The resulting mycelia formed on the medium were found to have the same morphology and fragrance as *matsutake* mushrooms.

The present invention will be explained in more detail with reference to the following examples in conjunction with the accompanying drawings. However, the following examples are provided only to illustrate the present invention, and the present invention is not limited to the examples.

EXAMPLE 1

Production of *T. Matsutake*-infected Young Pine Trees Using a Culture Container for a Fungus *Flammulina Velutipes*

Figure 4:
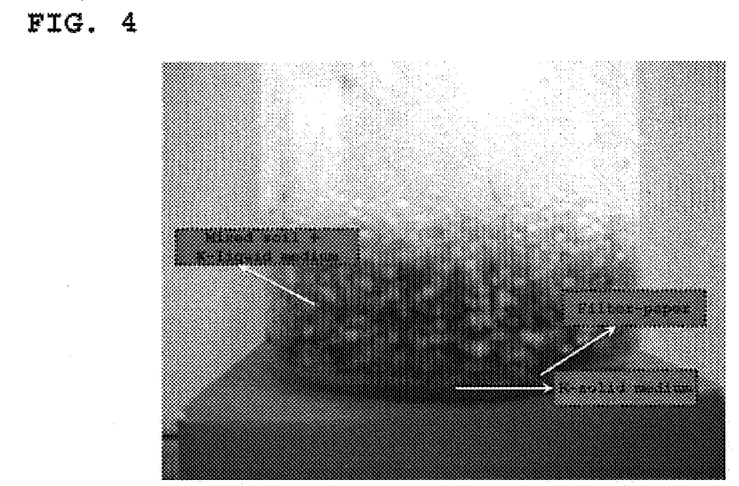
FIG. 4 is a photograph showing the composition of an infection medium for coculturing of aseptic pine seedlings and a *T. matsutake* isolate.

In order to obtain *T. matsutake*-infected young pine trees, as shown in FIG. 4, sterilized K-solid medium was poured into a sterilized culture container generally used for cultivation of the mushroom *Flammulina velutipes*, and allowed to harden. After covering the K-solid medium with a filter paper, mycelia from liquid-cultured fruit bodies of *T. matsutake* KBFERI 20T05 were inoculated onto the filter paper at an amount of 0.075 mg dry weight with 5 ml of sterile water. A mixture of perlite and *sphagnum* peatmoss at a ratio of 80:1.5 was added onto the inoculated fungal mycelia, and K-liquid medium of pH 5.6 was added into the soil, thus giving the infection medium. Then, seedlings obtained by aseptically germinating pine seeds were planted onto the infection medium containing the mixed soil and K-liquid medium, and the culture container was covered with a lid, followed by coculturing of the pine seedlings and the fungus *T. matsutake* at 20° C. for 24 hrs under 25,000 lux light intensity. Ectomycorrhizas formed on the fine roots of the pine seedlings were evaluated for fragrance, and their states of penetrating into the roots were investigated under a stereoscopic microscope, a fluorescent microscope and an electron microscope.

Herein, the K-solid medium was added up to a depth of below 5.0 mm. The filter paper used was N05B produced by the Advantec Company. The mixed soil was added up to a depth of below 5 cm.

In addition, the exterior of the culture container containing the infection medium was surrounded with aluminum foil up to a height of the infection medium, resulting in prevention of the penetration of light and thus protection of the *T. matsutake* mycelia and the roots of the pine seedlings.

As a result, ectomycorrhizas formed on the fine roots of the pine seedlings were found to have the same fragrance as *matsutake* mushrooms, and to form mycelial membranes under a stereoscopic microscope. When being observed under a light microscope, a fluorescent microscope and an electron microscope, intercellular penetration of mycelia on the fine roots was observed. In addition, the pine seedlings were found to be infected with the fungal mycelia within 70 days after coculturing. When a portion of the ectomycorrhizal fine roots was aseptically excised and planted onto MMN (Modified Melin-Norkron) medium, the fungal mycelia showed the characteristic mycelial growth of the fungus *T. matsutake* (drawings not shown), and the newly produced mushrooms emitted the same fragrance as naturally occurring *matsutake* mushrooms.

PREPARATIONAL EXAMPLE 1

Preparation of an Inoculum from Liquid-cultured *T. Matsutake*

A fungus *T. matsutake* used as an inoculum in the present invention was isolated from a naturally occurring *matsutake* mushroom, which was, right before its cap opened, collected from 10 ha of the Doyoo forest located in Namsan-dong Gyeongju-si Gyeongsangbuk-do, Korea. From the collected mushroom, the section between the cap and the gills was cut into pieces of 0.5 mm in size within 8 hrs after collection, and planted onto MMN medium of pH 5.5 prepared according to the composition shown in Table 2, below. Then, the isolated mycelia were further incubated in PDA medium at an optimal temperature for mycelial growth of *T. matsutake*, 23±0.5° C., for 60 days. *T. matsutake* fungus was successfully isolated from about 98% of the cultured mycelia. The isolated mycelia were found to have over 99% homology with a known *T. matsutake* fungus in ITS sequence and DNA sequences of whole 5.8S rRNA and a portion of 18S. The identified rDNA sequences were registered in Gene Bank on Apr. 3, 2001, and assigned Accession No. AF367417. In the present invention, the isolated *T. matsutake* fungus was designated as "KBFERI 20T05". Herein, as an inoculum for *T. matsutake*, naturally occurring *matsutake* mushroom-derived *mycelium* with over 99% homology to the known ITS sequence and DNA sequences of whole 5.8S and a portion of 18S of *T. matsutake* can be employed.

To obtain mycelial mass as an inoculum for production of *T. matsutake*-infected young pine trees of the present invention, the *T. matsutake* KBFERI 20T05 isolated from fruit bodies of a naturally occurring *matsutake* mushroom was cultured in PDA liquid medium (prepared by excluding agar from the composition listed in Table 2). The resulting fungal mycelial masses were washed with sterile water of pH 5.0, and then pulverized into fine particles in sterile water using a Waring's autoclavable blender 31L91. The pulverized fungal mycelia were uniformly inoculated onto the filter paper placed on the K-solid medium in the culture container using a 10 ml glass pipette.

TABLE 2

| Composition | Medium | |
| --- | --- | --- |
|  | MMN | PDA |
| Malt extract | 3.0 |  |
| $(NH_4)_2HPO_4$ | 0.25 |  |
| $KH_2PO_4$ | 0.5 |  |

TABLE 2-continued

| Composition | Medium | |
| --- | --- | --- |
| | MMN | PDA |
| MgSO$_4$•7H$_2$O | 0.15 | |
| CaCl$_2$ | 0.05 | |
| FeCl$_3$ | 1.2 | |
| NaCl | 0.025 | |
| Glucose | 10.0 | |
| Potato dextrose B | | 24.0 |
| Thiamine•HCl (filtered) | 0.1 | |
| pH | 5.5 | 5.5 |
| Agar | 15.0 | 15.0 |
| Water | Up to 1 L | Up to 1 L |

PREPARATIONAL EXAMPLE 2

Preparation of Infection Medium Using Mixed Soil and K-liquid Medium

As bed soil to cultivate pine seedlings, perlite and *sphagnum* peatmoss were employed. After being mixed at a ratio of 80:1.5, they were sterilized in a container. On a clean bench, the sterilized mixed soil was poured into the *T. matsutake* mycelia-inoculated culture container up to a suitable height.

K-liquid medium was prepared according to the composition shown in Table 1, above. After being autoclaved at a high temperature. 100 ml of K-liquid medium was poured onto the mixed soil on a clean bench.

PREPARATIONAL EXAMPLE 3

Production of Pine Seedlings by Aseptically Germinating Pine Seeds and their Planting Pine seeds were sterilized by being immersed in 70% ethanol for 60 sec and treated with 2% sodium hypochlorite for 4 min, and then washed with sterile water 3 times. After peeling the testa under aseptic condition, the sterilized seeds were planted onto solid medium prepared using Nutrient Broth (Scharlau) and agar (8 g/L) and hardened in sterilized disposable petri dishes, and incubated at 24° C. The germinated seeds both not contaminated with microorganisms and being 3 cm in length were selected, and planted into the infection medium contained in the culture container prepared in the Preparational Example 2.

Figure 1:
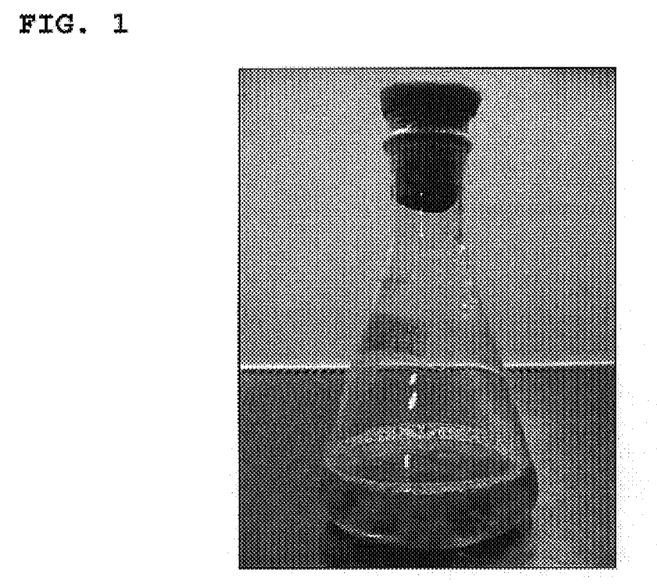
FIG. 1 is a photograph showing a result of liquid-culture of a fungus *T. matsutake* KBFERI 20T05 isolated from a naturally occurring *matsutake* mushroom.
Figure 2:
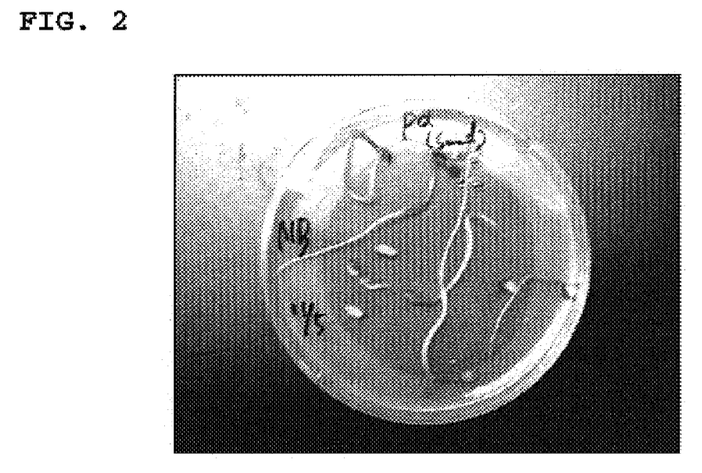
FIG. 2 is a photograph of aseptically germinated pine seedlings.

As shown in FIG. 2, the selected pine seedlings not infected with microorganisms were planted into the infection medium.

EXAMPLE 2

Figure 3:
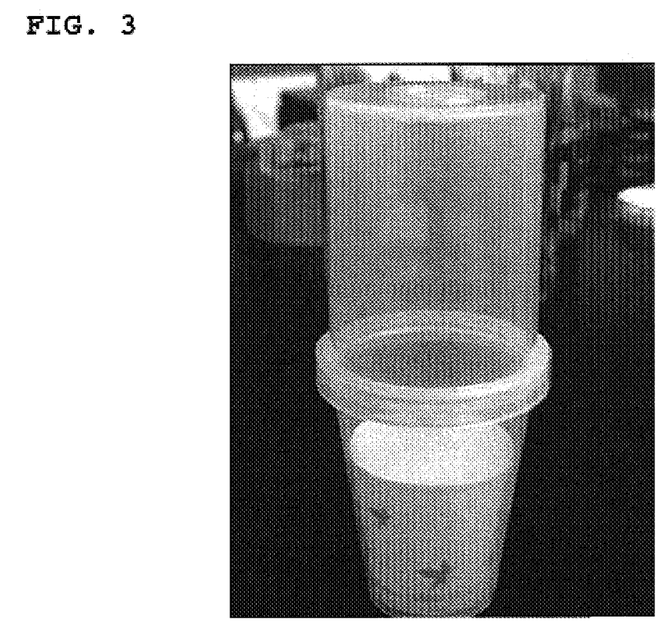
FIG. 3 is a photograph of a culture container into which a paper cup is inserted.

Production of *T. Matsutake*-infected Young Pine Trees using a Culture Container Containing a Paper Cup In order to produce *T. matsutake*-infected young pine trees, sterilized K-solid medium was poured into a sterilized culture container containing a paper cup, as shown in FIG. 3. Mycelia from fruit bodies of *T. matsutake* KBFERI 20T05, prepared according to the same method as in Preparational Example 1, were inoculated onto the bottom of the paper cup at an amount of 0.075 mg dry weight with 5 ml of sterile water. Mixed soil, prepared according to the same method as in Preparational Example 2, and 100 ml of K-liquid medium were poured onto the inoculated fungal mycelia, thus giving infection medium. Then, pine seedlings prepared according to the same method as in Preparational Example 3, were planted onto the infection medium, and the culture container was covered with a lid, followed by incubation at 20° C. for 24 hrs under 25,000 lux light intensity in an incubator equipped with 4 or more three-wavelength fluorescent lamps. Ectomycorrhizas formed on the fine roots of the pine seedlings were evaluated for fragrance, and their states of penetrating into the roots were investigated under a stereoscopic microscope, a fluorescent microscope and an electron microscope.

As a result of the coculturing of the pine seedlings and the fungus *T. matsutake*, ectomycorrhizas formed on the fine roots of the pine seedlings were found to have the same fragrance as *matsutake* mushrooms, and to form mycelial membranes under a stereoscopic microscope. When being observed under a light microscope, a fluorescent microscope and an electron microscope, intercellular penetration of mycelia on the fine roots was observed. In addition, the pine seedlings were found to be infected with the fungal mycelia within 70 days after coculturing. When a portion of the ectomycorrhizal fine roots was aseptically excised and planted onto MMN (Modified Melin-Norkron) medium, the fungal mycelia showed the characteristic mycelial growth of the fungus *T. matsutake* (drawings not shown), and the newly produced mushrooms emitted the same fragrance as naturally occurring *matsutake* mushrooms.

On the other hand, when the fungal mycelia were uniformly inoculated onto the bottom of a paper cup of the culture container, the inoculated mycelia grew forming multi-layered colonies. This type of growth pattern increases contact of the fine roots of the pine seedlings with the fungus *T. matsutake*.

PREPARATIONAL EXAMPLE 4

Preparation of Culture Container

In order to produce *T. matsutake*-infected young pine trees, as shown in FIG. 3, a commercially available paper cup (relatively small sized cup) was tightly inserted into the inside of a culture container while not being exposed to the upper portion of the culture container, and the culture container was then covered with a transparent lid. Then, the culture container was autoclaved at 121° C. for 20 min under a pressure of 1.2 atmospheres and cooled, and then further sterilized by exposure to ultra violet light on a clean bench.

EXAMPLE 3

Production of *T. Matsutake*-infected Young Pine Trees Using Soil from the *Matsutake* Mushroom-producing Field in a Culture Container Containing K-solid Medium In order to produce *T. matsutake*-infected young pine trees, into a paper cup-inserted culture container containing K-solid medium prepared according to the same method as in Example 1, mycelia from fruit bodies of *T. matsutake* KBFERI 20T05, prepared according to the same method as in Preparational Example 1, were inoculated onto the K-solid medium placed on the bottom of the paper cup at an amount of 0.075 mg dry weight with 5 ml of sterile water. Soil collected from the *matsutake* mushroom-producing field, prepared according to the same method as in Preparational Example 6, below, and 50 ml of K-liquid medium were poured onto the inoculated fungal mycelia, thus giving infection medium. Then, pine seedlings prepared according to the same method as in Preparational Example 3, were planted onto the infection medium, and the culture container was covered with a lid, followed by incubation at 20° C. for 24 hrs under 25,000 lux light intensity in an incubator equipped with 4 or more three-wavelength fluorescent lamps. Ectomycorrhizas formed on the fine roots of the pine seedlings were evaluated for fragrance, and their states of penetrating into the roots were investigated under a stereoscopic microscope, a fluorescent microscope and an electron microscope.

As a result of the coculturing of the pine seedlings and the fungus *T. matsutake*, ectomycorrhizas formed on the fine roots of the pine seedlings were found to have the same fragrance as *matsutake* mushrooms, and to form mycelial membranes under a stereoscopic microscope. When being observed under a light microscope, a fluorescent microscope and an electron microscope, intercellular penetration of mycelia on the fine roots was observed. In addition, the pine seedlings were found to be infected with the fungal mycelia within 70 days after coculturing. When a portion of the ectomycorrhizal fine roots was aseptically excised and planted onto MMN (Modified Melin-Norkron) medium, the fungal mycelia showed the characteristic mycelial growth of the fungus *T. matsutake* (drawings not shown), and the newly produced mushrooms emitted the same fragrance as naturally occurring *matsutake* mushrooms.

PREPARATIONAL EXAMPLE 5

Preparation of K-solid Medium-containing Culture Container

A culture container for coculturing of the pine seedlings and the fungus *T. matsutake* was prepared as follows. As shown in FIG. 3, a commercially available paper cup (a relatively small cup) was tightly inserted into a culture container while not being exposed to the upper portion of the culture container, and the culture container was then covered with a transparent lid. Then, the culture container was autoclaved at 121° C. for 20 min under a pressure of 1.2 atmospheres and cooled, and then further sterilized by exposure to ultra violet light on a clean bench. On a clean bench, K-solid medium (pH 5.6) prepared according to the composition listed in Table 1 was poured into the paper cup in the culture container to a thickness of 2 cm, preferably about 0.5 mm, and allowed to harden.

PREPARATIONAL EXAMPLE 6

Preparation of Infection Medium Using Soil from the *Matsutake* Mushroom-producing Field and K-liquid Medium Bed soil for cultivation of the pine seedlings, was prepared using soils from the *matsutake* mushroom-producing field. Soils were individually collected from the three soil layers, surface soil layer, fine grained soil layer and coarse grained soil layer, and added onto the K-solid medium in the paper cup of Preparational Example 5 while maintaining the natural structure. That is, K-liquid medium, coarse grained soil, fine grained soil layer and surface soil were sequentially added into the paper cup. Then, K-liquid medium (pH 5.6) was prepared according to the composition listed in Table 1, autoclaved at 121° C. for 20 min under a pressure of 1.2 atmospheres and cooled. Then, 50 ml of the cooled K-liquid medium was poured onto the soil on a clean bench.

EXAMPLE 4

Production of *T. Matsutake*-infected Young Pine Trees using Mixed Soil in a Culture Container Containing K-solid Medium In order to produce *T. matsutake*-infected young pine trees, into a paper cup-inserted culture container containing K-solid medium prepared according to the same method as in Example 1, mycelia from fruit bodies of *T. matsutake* KBFERI 20T05, prepared according to the same method as in Preparational Example 1, were inoculated onto the K-solid medium placed on the bottom of the paper cup at an amount of 0.075 mg dry weight with 5 ml of sterile water. Mixed soil prepared according to the same method as in Preparational Example 2 and 100 ml of K-liquid medium were poured onto the inoculated fungal mycelia, thus giving infection medium. Then, pine seedlings prepared according to the same method as in Preparational Example 3, were planted onto the infection medium, and the culture container was covered with a lid, followed by incubation at 20° C. for 24 hrs under 25,000 lux light intensity in an incubator equipped with 4 or more three-wavelength fluorescent lamps. Ectomycorrhizas formed on the fine roots of the pine seedlings were evaluated for fragrance, and their states of penetrating into the roots were investigated under a stereoscopic microscope, a fluorescent microscope and an electron microscope.

Figure 5:
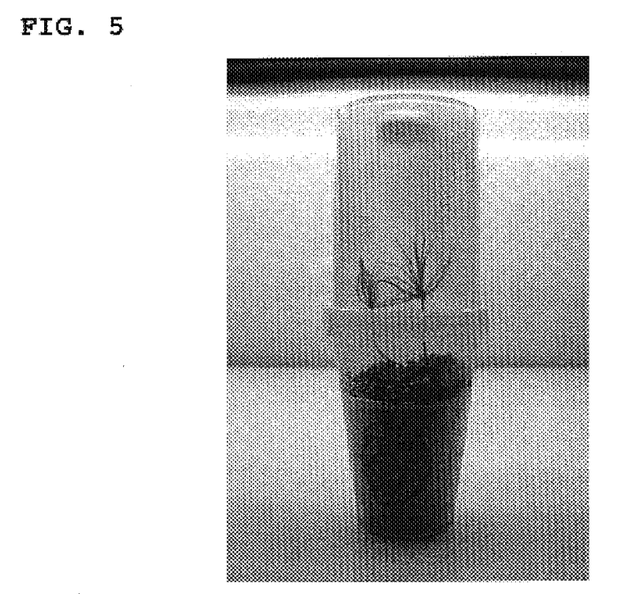
FIG. 5 is a photograph of young pine trees infected with mycelia of a *T. matsutake* isolate.
Figure 6:
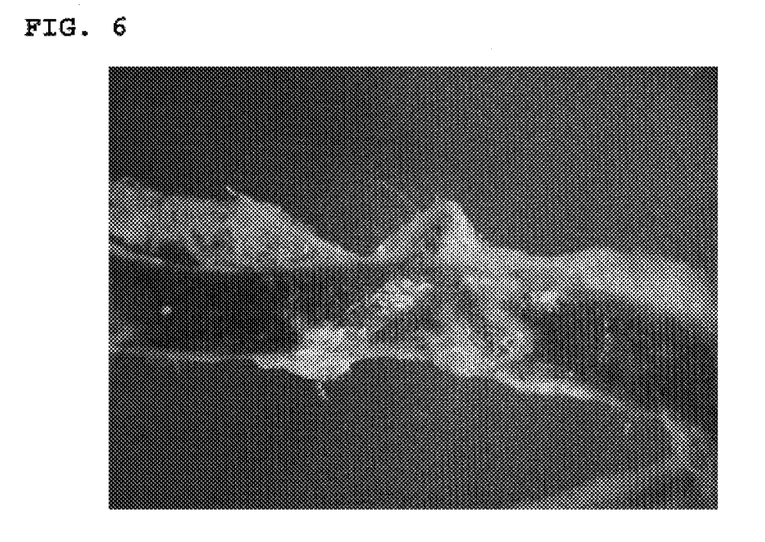
FIG. 6 is a photograph of a fine root of a pine tree having ectomycorrhizas formed on its roots, wherein the fine root is observed under a stereoscopic microscope.
Figure 7:
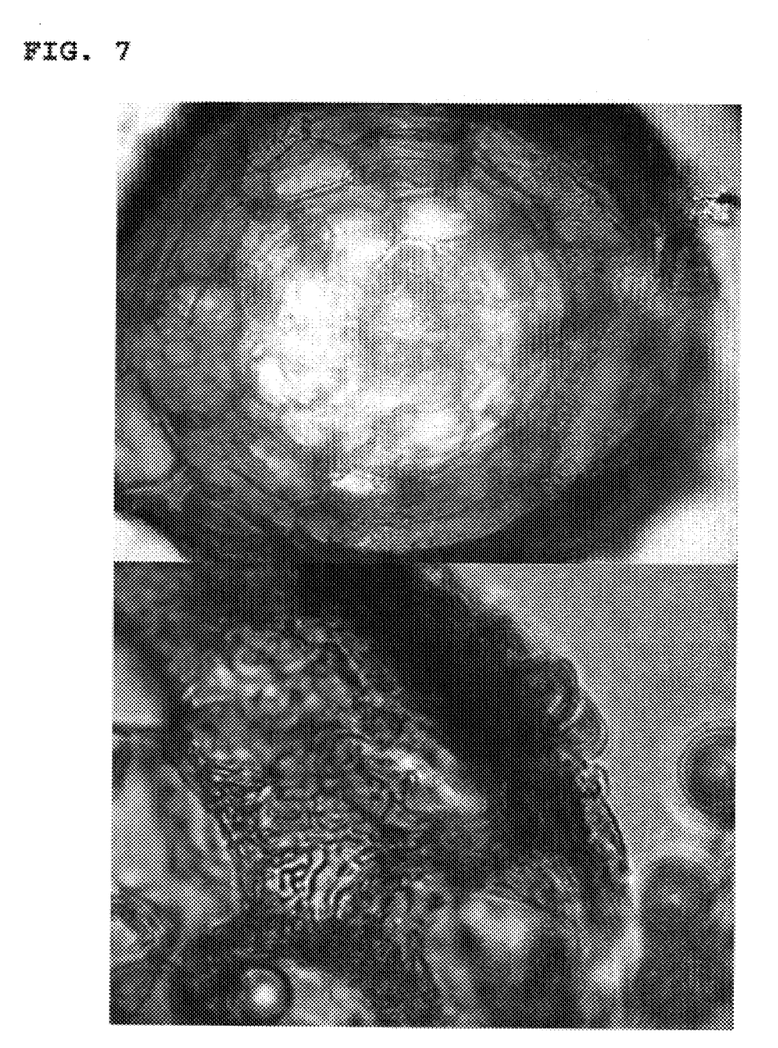
FIG. 7 is a photograph of *T. matsutake* mycelia penetrated into the fine root of a pine seedling, wherein the mycelia are observed under a light microscope.
Figure 8:
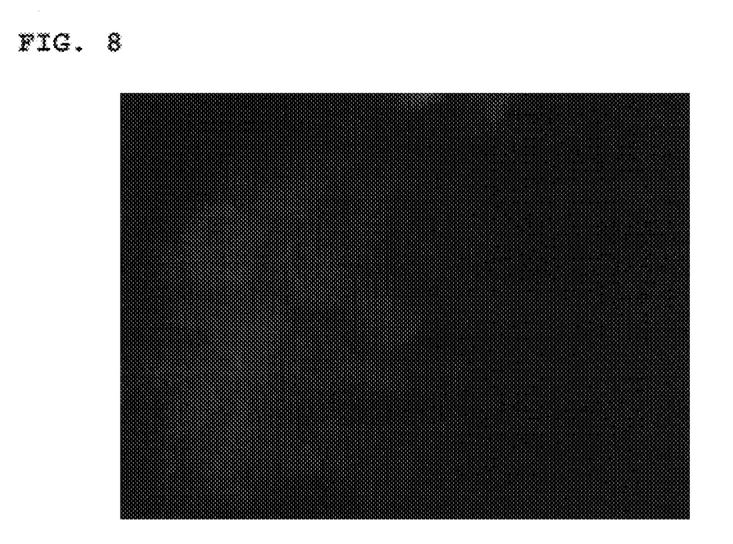
FIG. 8 is a photograph of *T. matsutake* mycelia penetrated into the fine root of a pine seedling, wherein the mycelia are observed under a fluorescent microscope.

As shown in FIG. 5, the pine seedlings were found to be infected with the fungus *T. matsutake*. Ectomycorrhizas formed on the fine roots were found to have the same fragrance as *matsutake* mushrooms, and, as shown in FIG. 6, to form mycelial membranes under a stereoscopic microscope. As shown in FIGS. 7 and 8, intercellular penetration of mycelia on the thread-like fine roots was observed under a light microscope, a fluorescent microscope and an electron microscope. In addition, the pine seedlings were found to be infected with the fungal mycelia within 70 days after coculturing.

Figure 9:
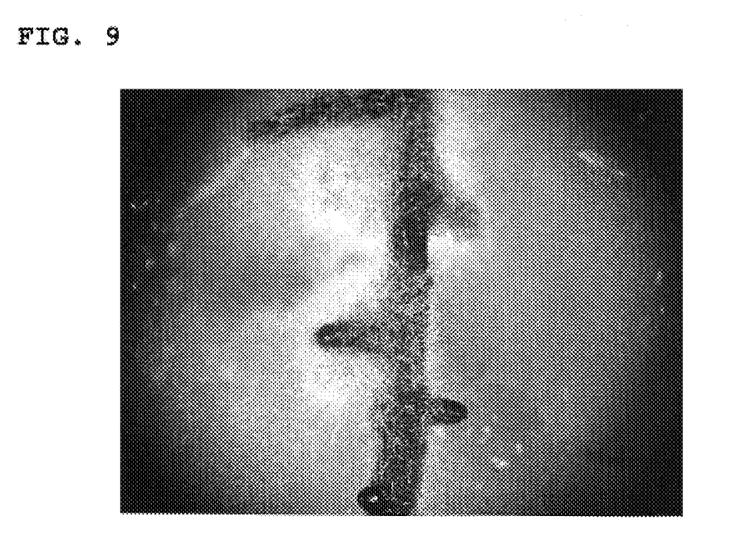
FIG. 9 is a photograph of *T. matsutake* mycelia grown on PDA solid medium when a piece of the fine root of a pine tree having the mycelia on its root is incubated on the PDA medium.

When a portion of the ectomycorrhizal fine roots was aseptically excised and planted onto MMN (Modified Melin-Norkron) medium, as shown in FIG. 9, the fungal mycelia showed the characteristic mycelial growth of the fungus *T. matsutake*.

As described in the Examples, the method of preparing *T. matsutake*-infected young pine trees according to the present invention is effective in selectively infecting the roots of pine trees with only the fungus *T. matsutake* by in vitro coculturing aseptic seedlings of a pine tree with the fungal mycelia. By employing a *T. matsutake* isolate having DNA sequence homology with the conventionally known *T. matsutake* fungus in ITS region, whole region of 5.8S and a portion of 18S was used in the present invention, the method of the present invention is advantageous in terms of giving objectivity for the *T. matsutake* inoculum and the young pine trees infected with the fungus. In addition, the method provides convenience to planting work thanks to easy removal of the paper cup upon transplanting into the field, and is relatively effective in rooting of *T. matsutake*. Further, the method is very useful for in vitro cultivation of *T. matsutake* mushroom in terms of making it possible to mass production *T. matsutake*-infected pine trees throughout the Year.

What is claimed is:

1. A method of preparing a *Tricholoma matsutake*-infected young pine tree, comprising the steps of:

inoculating fungal mycelia obtained by pulverizing *Tricholoma matsutake* fruit bodies liquid-cultured in potato dextrose broth medium into the bottom of a sterilized culture container at an amount of 0.01-0.02 mg dry weight/mL sterile water;

mixing perlite and sphagnum peatmoss at a ratio of 80:1-2, and placing the resulting mixed soil onto the inoculated fungal mycelia;

preparing K-liquid medium containing 1.65 g of $NH_4NO_3$, 0.2 g of $KNO_3$, 0.002 g of $CaCl_2.2H_2O$, 0.02 g of KCl, 0.2 g of $KH_2PO_4$, 0.9 g of $MgSO_4.7H_2O$, 0.2 g of $(NH_4)_2HPO_4$, 0.5 g of $NH_4$-Tar, 0.5 ml of Fe-Cit, 0.031 g of $H_3BO_3$, 0.01516 g of $MnSO_3.4H_2O$, 0.0086 g of $ZnSO_4.7H_2O$, 0.00083 g of KI, 0.00025 g of $Na_2MoO_4.2H_2O$, 100 µg of Thiamine HCl, 1.0 g of malt extract, 0.5 g of yeast extract, 0.3 g of casein and 3.0 g of glucose per 1 L in water, adjusting pH of the medium to pH 5.5-5.6, and aliquotting the K-liquid medium onto the mixed soil;

aseptically germinating pine seeds up to 3 cm in length, planting the resulting aseptic seedlings into infection medium containing the mixed soil and the K-liquid medium, and covering the culture container with a lid; and coculturing the pine seedling and the *Tricholoma matsutake* mycelia at 15-25° C. for 24 hrs under 10-40,000 lux light intensity.

2. The method as set forth in claim 1, prior to the step of inoculating the fungal mycelia obtained by pulverizing *Tricholoma matsutake* fruit bodies liquid-cultured in potato dextrose broth medium into the bottom of the sterilized culture container, further comprising the step of preparing K-solid medium containing 1.65 g of $NH_4NO_3$, 0.2 g of $KNO_3$, 0.002 g of $CaCl_2.2H_2O$, 0.02 g of KCl, 0.2 g of $KH_2PO_4$, 0.9 g of $MgSO_4.7H_2O$, 0.2 g of $(NH_4)_2HPO_4$, 0.5 g of $NH_4$-Tar, 0.5 ml of Fe-Cit, 0.031 g of $H_3BO_3$, 0.01516 g of $MnSO_3.4H_2O$, 0.0086 g of $ZnSO_4.7H_2O$, 0.00083 g of KI, 0.00025 g of $Na_2MoO_4.2H_2O$, 100 µg of Thiamine HCl, 1.0 g of malt extract, 0.5 g of yeast extract, 0.3 g of casein, 10.0 g of glucose and 2.0 g of phytagel per 1 L in distilled water, adjusting pH of the K-solid medium to pH 5.5-5.6, and aliquotting the K-solid medium into the culture container.

3. The method as set forth in claim 1, wherein a paper cup is tightly inserted into the culture vessel.

4. The method as set forth in claim 2, wherein the K-solid medium is aliquotted onto the bottom of the culture container at a thickness of 0.5 mm to 2 cm.

5. A *Tricholoma matsutake*-infected young pine tree, prepared by a process comprising the steps of:

inoculating fungal mycelia obtained by pulverizing *Tricholoma matsutake* fruit bodies liquid-cultured in potato dextrose broth medium into the bottom of a sterilized culture container at an amount of 0.01-0.02 mg dry weight/mL sterile water;

mixing perlite and sphagnum peatmoss at a ratio of 80:1-2, and placing the resulting mixed soil onto the inoculated fungal mycelia;

preparing K-liquid medium containing 1.65 g of $NH_4NO_3$, 0.2 g of $KNO_3$, 0.002 g of $CaCl_2.2H_2O$, 0.02 g of KCl, 0.2 g of $KH_2PO_4$, 0.9 g of $MgSO_4.7H_2O$, 0.2 g of $(NH_4)_2HPO_4$, 0.5 g of $NH_4$-Tar, 0.5 ml of Fe-Cit, 0.031 g of $H_3BO_3$, 0.01516 g of $MnSO_3.4H_2O$, 0.0086 g of $ZnSO_4.7H_2O$, 0.00083 g of KI, 0.00025 g of $Na_2MoO_4.2H_2O$, 100 µg of Thiamine HCl, 1.0 g of malt extract, 0.5 g of yeast extract, 0.3 g of casein and 3.0 g of glucose per 1 L in water, adjusting pH of the medium to pH 5.5-5.6, and aliquotting the K-liquid medium onto the mixed soil;

aseptically germinating pine seeds up to 3 cm in length, planting the resulting aseptic seedlings into infection medium containing the mixed soil and the K-liquid medium, and covering the culture container with a lid; and coculturing the pine seedling and the *Tricholoma matsutake* mycelia at 15-25° C. for 24 hrs under 10-40,000 lux light intensity.

* * * * *